US011527823B2

(12) United States Patent
Scordilis

(10) Patent No.: US 11,527,823 B2
(45) Date of Patent: Dec. 13, 2022

(54) ANTENNA FOR NEAR-FIELD COMMUNICATION

(71) Applicant: The Swatch Group Research and Development Ltd, Marin (CH)

(72) Inventor: Thierry Scordilis, Cormondreche (CH)

(73) Assignee: The Swatch Group Research and Develonment Ltd, Marin (CH)

( * ) Notice: Subject to any disclaimer, the term of this patent is extended or adjusted under 35 U.S.C. 154(b) by 137 days.

(21) Appl. No.: 16/927,319

(22) Filed: Jul. 13, 2020

(65) Prior Publication Data

US 2021/0066792 A1 Mar. 4, 2021

(30) Foreign Application Priority Data

Aug. 27, 2019 (EP) ..................... 19193810

(51) Int. Cl.
*H01Q 1/44* (2006.01)
*H01Q 1/36* (2006.01)
*H01Q 7/00* (2006.01)
*H04B 5/00* (2006.01)

(52) U.S. Cl.
CPC ............. *H01Q 1/44* (2013.01); *H01Q 1/36* (2013.01); *H01Q 7/00* (2013.01); *H04B 5/0025* (2013.01)

(58) Field of Classification Search
CPC ... H01Q 1/44; H01Q 1/36; H01Q 7/00; H04B 5/0025; H04B 5/0081; G06K 19/077
See application file for complete search history.

(56) References Cited

U.S. PATENT DOCUMENTS

| 2009/0051620 A1 | 2/2009 | Ishibashi et al. |
| 2018/0039877 A1* | 2/2018 | Staub ........................ H01Q 5/00 |
| 2019/0109373 A1 | 4/2019 | Ahn et al. |

FOREIGN PATENT DOCUMENTS

| JP | 2018-512653 A | 5/2018 |
| JP | 2019-016868 A | 1/2019 |
| JP | 2019-041273 A | 3/2019 |
| WO | 2006/106982 A2 | 10/2006 |

OTHER PUBLICATIONS

European Search Report for EP 19 19 3810 dated Dec. 20, 2019.
Communication dated Jul. 6, 2021 from the Japanese Patent Office in Application No. 2020-127057.

* cited by examiner

*Primary Examiner* — Andrea Lindgren Baltzell
(74) *Attorney, Agent, or Firm* — Sughrue Mion, PLLC

(57) ABSTRACT

An antenna (100) for near-field communication including an electrically conducting track (102). This track (102) defines, by the pattern thereof, a primary shape of the antenna and includes an arrangement of primary portions (121) of the same width and of secondary portions (122) of different widths to that of the primary portions (121), such that the arrangement forms a figurative image (123) on the antenna (100).

9 Claims, 3 Drawing Sheets

ANTENNA FOR NEAR-FIELD COMMUNICATION

CROSS REFERENCE TO RELATED APPLICATIONS

This application is Non-Provisional application, claiming priority based on European Patent Application No. 19193810.9 filed Aug. 27, 2019.

TECHNICAL FIELD

The technical field of the present invention relates to that of antennas, and more specifically that of near-field communication antennas.

TECHNOLOGICAL BACKGROUND

Antennas for near-field communications are known in the prior art. These antennas can be visible to the user, and the shape of the antenna can be modified to improve the visual appearance thereof.

However, upon each modification to the antenna, the performance levels of the antenna are altered accordingly and the radio frequency circuit used must be re-adapted.

A solution should be found allowing the aesthetic appearance of the antenna to be modified without the need to adapt the radio frequency circuit used according to these modifications.

SUMMARY OF THE INVENTION

The present invention proposes overcoming all or part of these drawbacks by way of an antenna for near-field communication comprising an electrically conducting track; said electrically conducting track defining a primary shape of said antenna and comprising an arrangement of primary portions of the same width and of secondary portions of different widths to that of the primary portions, such that said arrangement forms a figurative image.

Thanks to this disposition, the aesthetic appearance of the antenna can be modified without the need to adapt the radio frequency circuit used according to these modifications.

According to one embodiment, said widths of said secondary portions are discrete or vary gradually.

Thanks to this disposition, a figurative image can be procured with more or less detail.

According to one embodiment, said widths of said primary portions and/or of said secondary portions are less than 400 μm, in particular less than 200 μm and preferably less than 150 μm.

Thanks to this disposition, a figurative image can be procured with details and a more or less pronounced contrast.

According to one embodiment, the antenna comprises a distance between said primary portions and said secondary portions, said distance being less than 400 μm, in particular less than 200 μm and preferably less than 150 μm.

Thanks to this disposition, a figurative image can be procured with details and a more or less pronounced contrast.

According to one embodiment, said electrically conducting track has a length that lies in the range 300 mm to 1,200 mm, in particular in the range 400 mm to 1,000 mm, preferably in the range 500 mm to 900 mm.

The present invention further relates to a method of manufacturing an antenna for near-field communication, said method comprising at least:

providing a first file comprising a figurative image and comprising a first data set; said first data set being represented in a first reference frame;

converting said first data set of said first file into a second data set; said second data set being comprised in a second file and being represented in a second reference frame;

providing a third file representing a primary shape of said antenna formed by an electrically conducting track;

combining said second file and said third file by subdividing said electrically conducting track into primary portions of the same width and into secondary portions of different widths to that of the primary portions;

arranging said primary portions and said secondary portions so as to form said figurative image on or in said primary shape.

Thanks to this disposition, the aesthetic appearance of the antenna can be modified without the need to adapt the radio frequency circuit used according to these modifications.

The embodiments and the alternative embodiments mentioned hereinabove can be taken singly or according to any combination technically possible.

The present invention will be properly understood and the advantages thereof will appear upon reading the following description given solely as a non-limiting example and with reference to the accompanying figures, wherein identical reference signs correspond to structurally or functionally identical or similar elements.

BRIEF DESCRIPTION OF THE FIGURES

The invention will be described in more detail hereafter using the accompanying drawings, given by way of examples that are in no way limiting, wherein.

DETAILED DESCRIPTION OF THE INVENTION

Figure 1A:
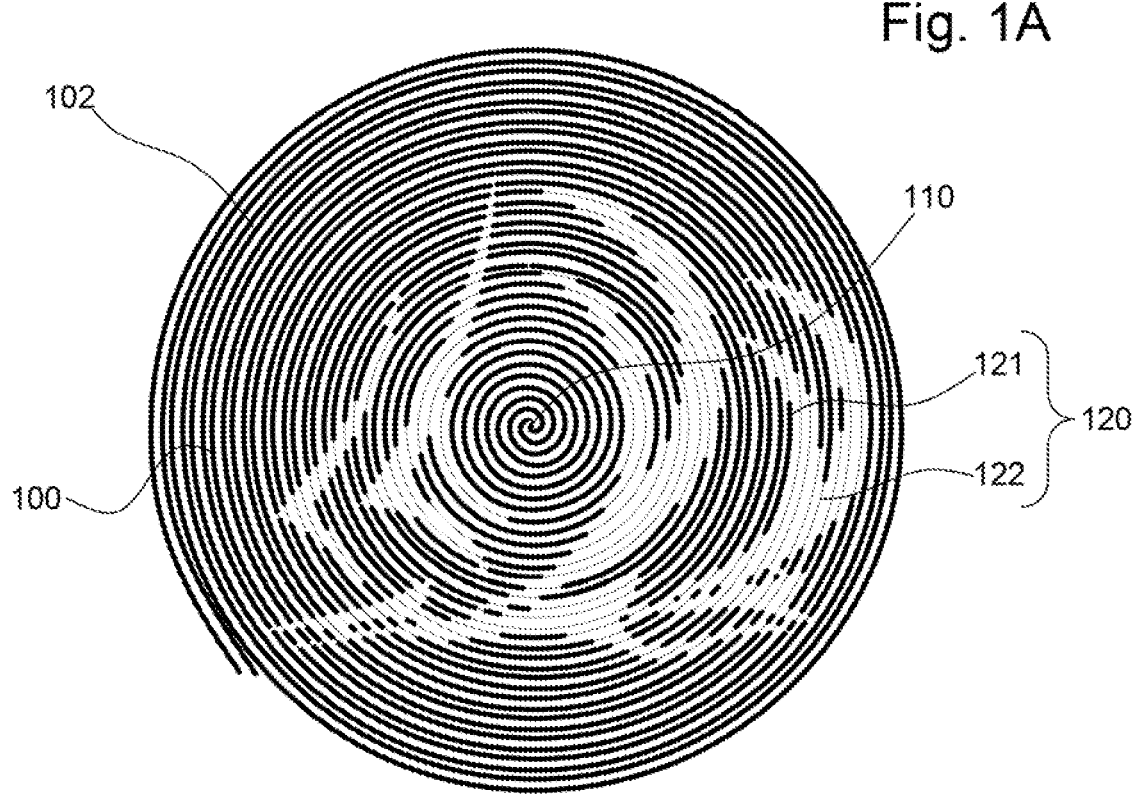
FIGS. 1A and 1B show an antenna according to the invention in one embodiment and a figurative image (120) respectively.
Figure 1B:
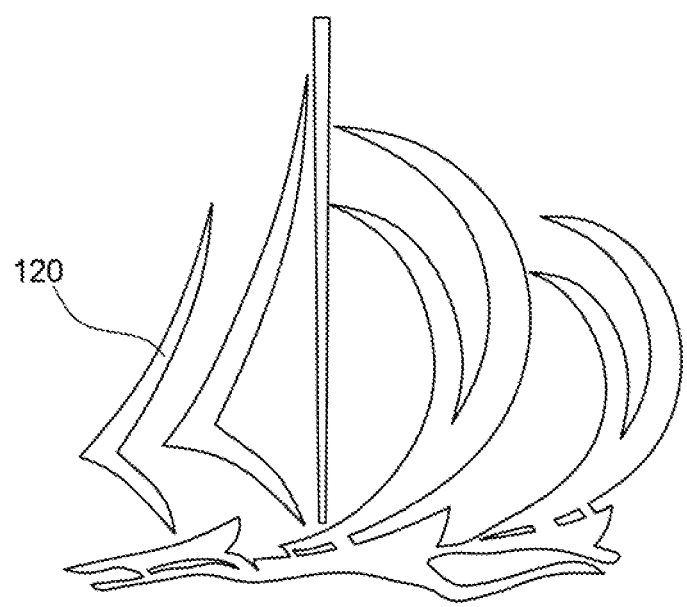
Figure 2A:
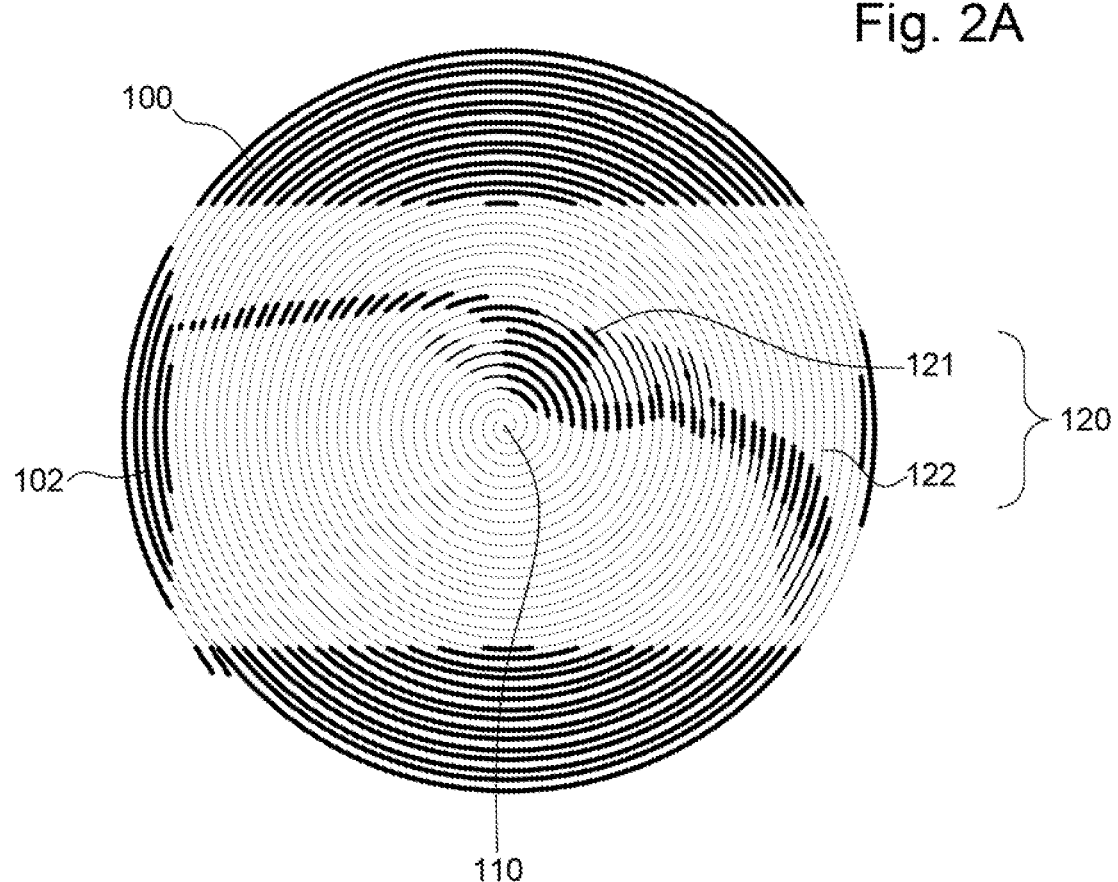
FIGS. 2A and 2B show an antenna according to the invention in another embodiment and another figurative image (120) respectively.
Figure 2B:
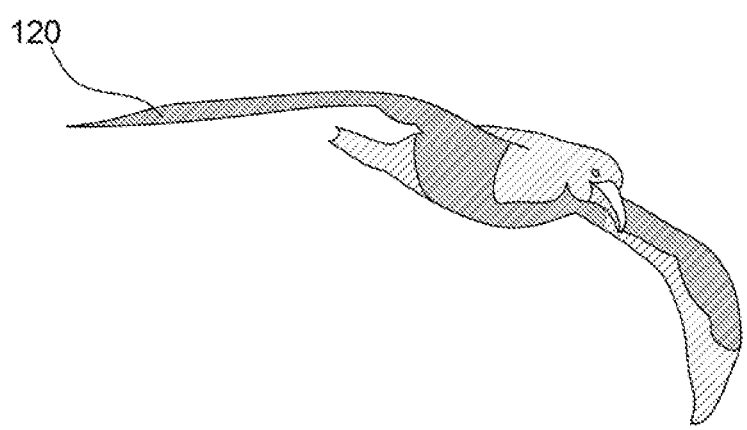
Figure 3:
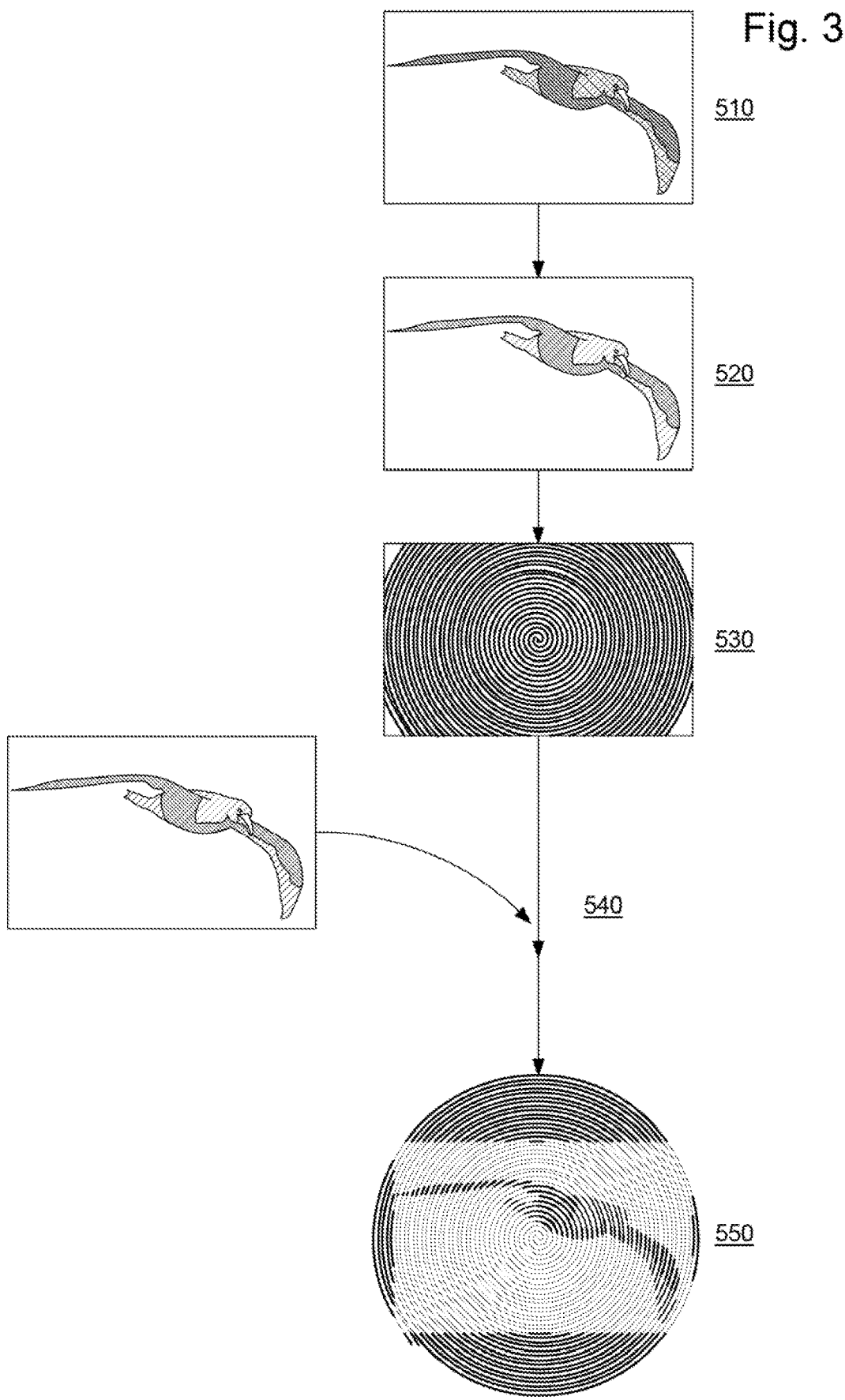
FIG. 3 shows a method of manufacturing an antenna (500) for near-field communication according to one embodiment.

The present invention, one embodiment whereof is shown in FIGS. 1A and 1B, takes on the form of an antenna 100 for near-field communication comprising an electrically conducting track 102 with a figurative image 120.

This electrically conducting track 102 defines a primary shape 110 of the antenna, which can take on the form of a circular or rectangular spiral, a coil or other shape.

The spiral can be a single or multiple spiral and can be an even and/or uneven curve beginning at a central point then moving further and further away from this central point with each turn, while revolving around this central point. Whereas a coil can be a line that changes direction in an even and/or uneven manner.

This primary antenna shape can be formed by the electrically conducting track 102, the length whereof can lie in the range 300 mm to 1,200 mm, in particular in the range 400 mm to 1,000 mm, preferably in the range 500 mm to 900 mm. For example, if the electrically conducting track 102, i.e. the spiral, comprises 4 turns, in other words 4 revolutions, with an overall diameter of 40 mm, the length can be equal to 500 mm and given that it can operate at 13 MHz, a value of about 1.5 pH is produced, to which a capacitance of 100 pF is added. The electrically conducting track 102 comprises an arrangement of primary portions 121 and of secondary portions 122. The primary portions 121 have an identical width to one another, whereas the secondary portions 122 have different widths to one another and different to that of the primary portions 121, such that the arrangement of the primary portions 121 and of the secondary portions 122 forms a figurative image 120. More precisely, the widths of the primary portions 121 and/or of the secondary portions 122 are less than 400 μm, in particular less than 200 μm and preferably less than 150 μm.

It is the modulation of these widths of the secondary portions 122 that allows the aesthetic appearance of the antenna to be modified without needing to adapt the radio frequency circuit used to these modifications or more precisely to these width modulations. More specifically, independently of the width of the primary portions 121 and secondary portions 122, the electrically conducting track 102 forms the pattern of the antenna in an uninterrupted manner and outlines the primary shape 110 of the antenna. It is only this variation in the widths of the secondary portions 122 and the arrangement of the primary portions 121 and of the secondary portions 122 that forms the figurative image 120.

More precisely, it is these modulations or variations in the widths of the secondary portions 122 that form the figurative image 120 by contrasting the substrate, generally paper, by gradually or discretely varying the widths of the secondary portions 122.

The finer these variations, i.e. the more gradual they are, the more detailed the figurative image 120 will be and the finer the contrast will be. This contrast can also be contingent upon the distance between the primary portions 121 and the secondary portions 122, which can be less than 400 μm, in particular less than 200 μm and preferably less than 150 μm.

This antenna 100 can be manufactured using a method for manufacturing an antenna 500. This method comprises a step of providing a first file 510 comprising a first data set representing a figurative image 120. This first data set can be represented in a reference frame, i.e. in a red, green and blue reference frame with or without an alpha channel for transparency.

This first data set 520 is then converted into a second data set with a second reference frame which can be a black and white image or an image, the light intensity whereof can be modulated so as to give a grey-scale representation. This second data set can be comprised in a second file.

A third file 530, representing the primary shape 110 of the antenna 100 formed by an electrically conducting track 102, is provided by the user and then combined with the second file. This primary shape 110 can be a circular or rectangular spiral, a coil or another shape.

The electrically conducting track 102 is then subdivided into primary portions 121 of the same width and into secondary portions 122 of different widths to those of the primary portions 121 so as to create an arrangement 550 of the primary portions 121 and of the secondary portions 122 that represents the figurative image 120 of the first file on or in the primary shape 110, without having to modify the radio frequency circuit used.

The invention claimed is:

1. An antenna (100) for near-field communication comprising an electrically conducting track (102); said electrically conducting track (102) defining a primary shape (110) of said antenna and comprising an arrangement of primary portions (121) of the same width and of secondary portions (122) of different widths to that of the primary portions (121), such that said arrangement forms a figurative image (120) by interpositions of ones of the primary portions (121) between ones of the secondary portions (122) along the electrically conducting track (102), wherein said widths of said secondary portions (122) are discrete or vary gradually.

2. The antenna (100) according to claim 1, wherein said widths of any of said primary portions (121) and said secondary portions (122) are less than 400 μm, in particular less than 200 μm and preferably less than 150 μm.

3. The antenna (100) according to claim 1, comprising a distance between said primary portions (121) and said secondary portions (122), said distance being less than 400 μm, in particular less than 200 μm and preferably less than 150 μm.

4. The antenna (100) according to claim 2, comprising a distance between said primary portions (121) and said secondary portions (122), said distance being less than 400 μm, in particular less than 200 μm and preferably less than 150 μm.

5. The antenna (100) according to claim 1, wherein said electrically conducting track (102) has a length that lies in the range 300 mm to 1,200 mm, in particular in the range 400 mm to 1,000 mm, preferably in the range 500 mm to 900 mm.

6. The antenna (100) according to claim 2, wherein said electrically conducting track (102) has a length that lies in the range 300 mm to 1,200 mm, in particular in the range 400 mm to 1,000 mm, preferably in the range 500 mm to 900 mm.

7. The antenna (100) according to claim 3, wherein said electrically conducting track (102) has a length that lies in the range 300 mm to 1,200 mm, in particular in the range 400 mm to 1,000 mm, preferably in the range 500 mm to 900 mm.

8. The antenna (100) according to claim 4, wherein said electrically conducting track (102) has a length that lies in the range 300 mm to 1,200 mm, in particular in the range 400 mm to 1,000 mm, preferably in the range 500 mm to 900 mm.

9. The antenna (100) according to claim 1 wherein, along the electrically conducting track (102), the arrangement comprises a spiral of the primary portions (121), the secondary portions (122), and the interpositions thereof.

* * * * *